(12) United States Patent
Finnig et al.

(10) Patent No.: US 10,642,906 B2
(45) Date of Patent: May 5, 2020

(54) DETECTION OF COORDINATED CYBER-ATTACKS

(71) Applicant: F-Secure Corporation, Helsinki (FI)

(72) Inventors: Marko Finnig, Helsinki (FI); Joakim Sandstrom, Helsinki (FI)

(73) Assignee: F-Secure Corporation, Helsinki (FI)

( * ) Notice: Subject to any disclaimer, the term of this patent is extended or adjusted under 35 U.S.C. 154(b) by 292 days.

(21) Appl. No.: 15/379,692

(22) Filed: Dec. 15, 2016

(65) Prior Publication Data

US 2017/0180402 A1  Jun. 22, 2017

(30) Foreign Application Priority Data

Dec. 18, 2015  (GB) .................................. 1522345.6

(51) Int. Cl.
| | | |
|---|---|---|
| *G06F 16/951* | (2019.01) | |
| *G06F 21/56* | (2013.01) | |
| *H04L 29/06* | (2006.01) | |

(52) U.S. Cl.
CPC ......... *G06F 16/951* (2019.01); *G06F 21/563* (2013.01); *G06F 21/566* (2013.01); *H04L 63/101* (2013.01); *H04L 63/1425* (2013.01); *H04L 2463/144* (2013.01)

(58) Field of Classification Search
CPC . H04L 63/1416; H04L 63/146; G06F 21/563; G06F 21/566
USPC ............................................................ 726/23
See application file for complete search history.

(56) References Cited

U.S. PATENT DOCUMENTS

| | | | |
|---|---|---|---|
| 8,560,413 B1 | 10/2013 | Quarterman et al. .......... 705/35 |
| 2005/0193430 A1* | 9/2005 | Cohen .................. G06F 21/577 726/25 |
| 2010/0037314 A1 | 2/2010 | Perdisci et al. ................. 726/22 |
| 2012/0117222 A1* | 5/2012 | Holloway ........... H04L 63/1416 709/224 |
| 2012/0204264 A1 | 8/2012 | Jiang .............................. 726/23 |
| 2013/0174256 A1 | 7/2013 | Powers .......................... 726/23 |
| 2013/0333038 A1* | 12/2013 | Chien ................. H04L 63/1408 726/23 |
| 2014/0090059 A1 | 3/2014 | Wang et al. .................... 726/23 |
| 2014/0310811 A1* | 10/2014 | Hentunen ........... H04L 63/1441 726/23 |
| 2015/0310098 A1* | 10/2015 | Chudnovskiy ........ G06F 21/577 726/25 |
| 2016/0044054 A1* | 2/2016 | Stiansen ............. H04L 63/1416 726/24 |

FOREIGN PATENT DOCUMENTS

KR  10-2012-0110852  10/2012

* cited by examiner

*Primary Examiner* — Teshome Hailu
(74) *Attorney, Agent, or Firm* — Harrington & Smith

(57) ABSTRACT

A method of detecting coordinated attacks on computer and computer networks via the internet. The method includes using a web crawler to crawl the world wide web to identify domains and subdomains and their associated IP addresses, and to identify links between domains and subdomains, and storing the results in a database. When an IP address is identified as malicious or suspicious, the IP address is used as a lookup in the database to identify the associated domain and subdomain, and linked domains and subdomains. Those linked domains and subdomains are then identified as malicious or suspicious.

11 Claims, 2 Drawing Sheets

DETECTION OF COORDINATED CYBER-ATTACKS

TECHNICAL FIELD

The present invention relates to the detection and investigation of coordinated cyber-attacks that make use of the Internet.

BACKGROUND

As organisations become more reliant on computer systems connected to the Internet, the opportunities to attack their computer systems increase. A criminal gang might, for example, command a "botnet" of computers infected by malware to perform a distributed denial-of-service attack. A government could arrange for a virus to be manually uploaded to a computer of a foreign company to gain access to and control of its network. An individual might embed malware on a website to cause a key-logger to be downloaded by an end user. The techniques involved in such attacks are constantly evolving and there is a constant battle between the attackers trying to exploit loopholes and those trying to stop them. Despite attempts to improve security and detection methods, intrusions and attacks are often discovered only after it is already too late. Even after an attack has been detected and analysed, it can be difficult to assess who is responsible for it or if the attacks can be linked to other similar attacks.

Comparing the malware code used in one attack to that used in another does not always provide much information about the identity or behavior of an attacker. Malware is often written specifically for its intended target, and there may be no discernable pattern linking two pieces of code even when written by the same author.

However, a cyber-attack will often require some form of connection to command and control servers or domains to enable the attacker to receive information from the infected machine(s) and, if required, send instructions to it. If a command and control server is located and identified, it can sometimes identify or provide clues as to who is behind a given attack.

In the case of an unsophisticated criminal gang controlling a botnet, it may be straightforward to identify the command and control servers and any associated domains. However, sophisticated entities such as government agencies are often far more effective at masking themselves and the servers and domains they use. In such a scenario, it can be difficult to extract any useful information to help to identify an attacker or link multiple attacks with a wider campaign.

Even if details of a command and control server and its associated domains are discovered, establishing which attacks are connected to it or if it is connected to other servers or domains is a time consuming manual task that consumes valuable resources that may be better deployed elsewhere.

US2014/0090059A1 describes a heuristic botnet detection method that involves monitoring network traffic to identify suspicious activity based on network traffic behaviour. However, in this method, threat detection and analysis occurs on an agent installed on an end-user's device and focuses on detecting whether malware is present on a particular machine so that it can be removed. It does not assist with higher level analysis of associating a particular piece of malware with a wider campaign or assist with reconstructing and identifying the links between the command and control servers and the malware they control.

US2012/0204264A1 describes a method and system for detecting botnets that rely on automatically reconstructing the command and control topology of a botnet through information obtained from a "trapped" sample of a botnet. However this method relies on acquiring a botnet sample (for example in a honeynet) before the botnet topology can be reconstructed. It is also not able to make any links between servers or domains outside of the command and control topology identified from the sample and is further not able to automatically analyse whether or not an arbitrary connection from an IP address is linked to a suspicious domain, a piece of malware, or an attack that is not part of the particular botnet being studied.

US 2013/0174256 A1 describes a method for detecting highly-distributed, stealth network attacks in which "visualization" of botnet nodes is achieved through an electronic map of the geographic locations of the botnet nodes. Again however, this method is not able to determine or analyse links outside of the particular botnet or attack being analysed.

U.S. Pat. No. 8,560,413B1 describes a method of visualisation of Internet nodes involved in distributed electronic crime in order to see patterns of actionable intelligence. The method focusses on using latency calculations between nodes to determine their geolocation after a network's topology has already been determined.

There is a need for an improved method of detecting and analysing coordinated cyber-attacks.

SUMMARY

According to a first aspect of the invention there is provided a method of detecting coordinated attacks on computer and computer networks via the internet. The method comprises using a web crawler to crawl the world wide web to identify domains and subdomains and their associated IP addresses, and to identify links between domains and subdomains, and storing the results in a database. When an IP address is identified as malicious or suspicious, the IP address is used as a lookup in the database to identify the associated domain and subdomain, and linked domains and subdomains. Those linked domains and subdomains are then identified as malicious or suspicious.

Links between domains and subdomains may be identified, for example, by the inclusion of a hyperlink in a web page of one domain or subdomain to a web page of another domain or subdomain. A link may also be identified based upon similarity of content, e.g. web pages of separate subdomains having similar or identical content.

The method may further comprise detecting further connections or connection attempts to or from the computer or computer network, determining that the associated remote IP addresses are associated with the linked domains and subdomains, and as result identifying a coordinated attack.

The step of identifying a remote IP address as being malicious or suspicious may comprise comparing the IP address against IP addresses stored in a database containing known IP addresses and respective indications of trustworthiness.

The method may comprise continuously performing the step of using a web crawler to crawl the world wide web in order to construct a massive database of linked domains and subdomains and their IP addresses.

In the event that no linked domains or subdomains are identified, or the information is considered out of date, the method may comprise directing the web crawler to crawl a selected part of the world wide web in dependence upon the domain and subdomain associated with the IP address.

The method may comprise performing said step of detecting a connection or connection attempt to or from a computer or computer network at the computer or the computer network, sending an event notification including the remote IP address, to a central server or server cloud, and performing said step of identifying at the central server.

According to a second aspect of the invention there is provided a system for detecting coordinated attacks on computers and/or computer networks via the Internet. The system comprises a first computer configured to crawl the world wide web to identify domains and subdomains and their associated IP addresses, to identify links between domains and subdomains, and to store the results in a database. The system further comprises a second computer configured to detect or receive a notification that a connection or connection attempt has been made to or from a remote computer or remote computer network, to identify a remote IP address associated with the connection or connection attempt as being malicious or suspicious, to use the IP address as a lookup in the database to identify the associated domain and subdomain, and any linked domains and subdomains, and to identify those linked domains and subdomains as malicious or suspicious.

According to a third aspect of the invention there is provided a computer program product comprising a computer storage medium having computer code stored thereon which, when executed on a computer system, causes the system to operate as a system according to the above second aspect of the invention.

DETAILED DESCRIPTION

An approach to improving cyber security will now be described which relies upon a "massive" database which contains associations between domain and subdomain addresses. Such a database is created using a web crawler which is an Internet bot which systematically browses the World Wide Web to obtain web page data. The Internet bot responsible for the crawling is typically maintained by a security service provider. The data retrieved by the crawler is analysed in order to identify mappings between IP addresses and domains/subdomains, and associations between domains and subdomains. Thus, for example, a given web page retrieved from a domain/subdomain may be parsed to identify links to other domains/subdomains. Web page data may be parsed to identify other information, such as text, code, images etc, that may be useful in associating domains and subdomains, e.g. by matching common information. Once IP address mappings and links between domains/subdomains are identified, they are stored in a crawler database. The content of the crawler database may be enriched using data collected from other sources.

Figure 1:
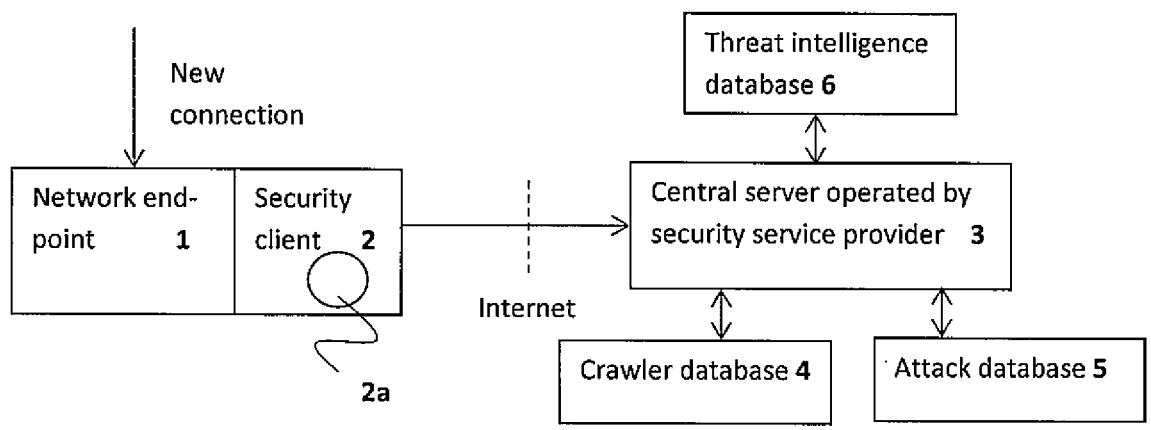
FIG. 1 illustrates schematically a network security architecture.

FIG. 1 illustrates schematically a network architecture including a network end-point 1 such as a home computer or a computer within an organisation's network. The end-point may alternatively be a server, firewall, etc. A security client 2, provided by the security service provider, is installed on the network end-point and is configured to detect threats such as the presence of malware or intrusion attacks. The security client comprises a "sensor" 2a that is configured to detect network connections.

FIG. 1 also illustrates a central server 3 operated by the security service provider and which communicates with the crawler database 4. The crawler database may consist of one or more separate databases. The central server 3 also communicates with a "reputation" database 5 and a "threat intelligence" database 6. The reputation database 5 stores IP addresses known to be associated with malicious or suspicious behaviour. An IP address is stored in the reputation database, e.g. following some manual or automatic determination. For example, a determination may be made that an IP address is associated with a web page that causes malware to be downloaded to an end user's computer. The threat intelligence database 6 on the other hand stores all known IP addresses and their reputations. Reputations may be determined according to a "sliding scale", from known bad, to unknown, to known good. The threat intelligence database 6 may also store so-called "indicators of compromise" such as virus signatures etc. Importantly, the threat intelligence database 6 stores maps of the domains/subdomains that may or may not be part of a coordinated attack.

The network end-point 1 (together with other end-points not shown) communicates with the central server 3 via the Internet. This architecture is only exemplary of course, and other architectures will be envisaged. For example, the central server (and databases) may be implemented by means of a server cloud and/or distributed database.

Operators of the network end-points that subscribe to the security service provider's services may request that an improved method of detecting coordinated attacks is implemented as part of their subscription. This additional, new service is described below. The end-point operator may request the service as a standard service, e.g. continuous monitoring, or may request the service when it thinks that it is, or might become, the target of a coordinated cyber-attack, e.g. an attack making use of a botnet. An example of such an attack is a denial-of-service attack in which the attacker brings down the operator's network or service by bombarding it with access requests.

Figure 2:
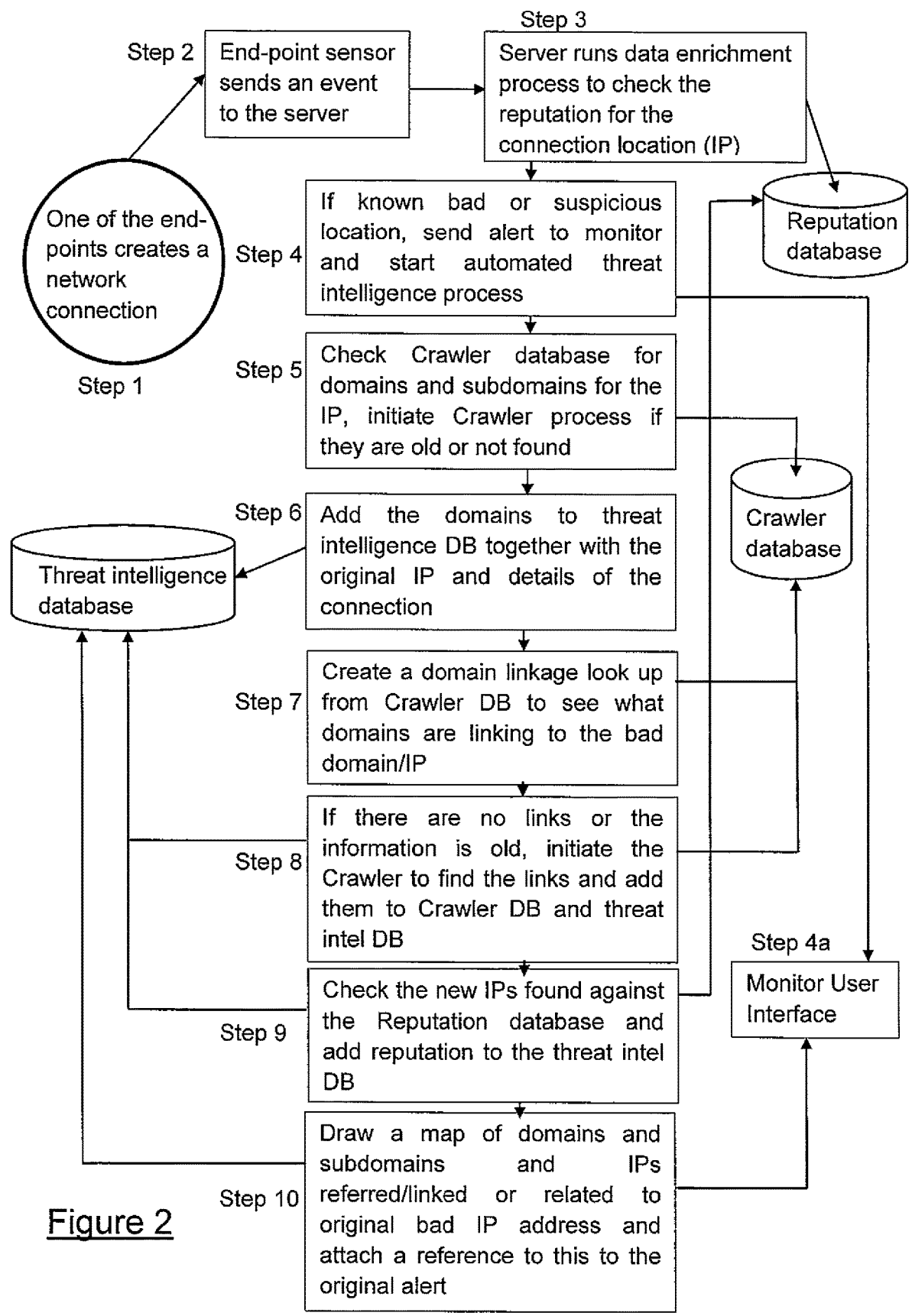
FIG. 2 is flow diagram illustrating a method of active threat assessment.

FIG. 2 is a flow diagram illustrating an improved method of detecting coordinated attacks on organisations via the Internet and which makes use of the crawler database and the data contained therein. The detection method may be carried out by the security service provider, or by an authorized party having access to the crawler database.

At step 1, once the improved method of detecting coordinated attacks is activated, the sensor at the security client detects that a network connection has been made. At step 2, for each incoming connection request received at the network end-point 1, the sensor 2a creates an "event" containing the remote IP address of the connection together with any associated, extractable metadata and sends the event information to the central server 3. This metadata could include a date and time stamp, information about ports, keys and certificates used, or any other information obtainable for the connection. At this stage, the network end-point 1 may allow or deny the connection request, or take other local action, depending upon locally deployed policies.

At step 3, the central server 3 receives the event information and runs a data enrichment process. The data enrichment process compares the event IP address with those contained in the reputation database 5. At step 4, if it is determined that the event IP address does not match any IP addresses identified in the reputation database as malicious (or possibly also suspicious depending upon the system configuration), no further action is taken. However, if the event IP address is identified as malicious, an automated threat protection (ATP) process is commenced, and the central server sends an alert to a monitor interface (UI) operated by the security service provider. The alert is presented in the monitor UI at step 4*a*.

Assuming that the ATP process is commenced, at step 5, the central server 3 accesses the crawler database 4 and uses the event IP address to look up domain and subdomain addresses for the event IP address. These domains and subdomains are those directly behind the IP address. If the entries on the crawler database 4 are considered to be out of date based on predetermined criteria, or if no entries are found, the central server 3 initiates the web crawler to obtain/refresh the data. Any new or updated information retrieved by the web crawler is added to the crawler database. The process proceeds to step 6, which involves the central server 3 updating the threat intelligence database 6 with the event information and an indication that an attack has been detected. The domains/subdomains identified at step 5 are also added to the threat intelligence database.

The process proceeds to step 7. This involves querying the crawler database, using the event IP address and/or the domains/subdomains retrieved at step 6, to identify domains and subdomains that have previously been linked to the queried IP address or domains/subdomains. If no links are found, or if the information available is considered to be out of date, the web crawler may be initiated to obtain new or refreshed data (step 8). Any new or refreshed information is stored in the crawler database 4 and, if necessary, in the threat intelligence database 6.

At step 9, as part of the ATP process, the central server 3 queries the reputation database 5 to check whether or not the newly identified IP addresses are already identified as malicious or suspicious. Depending upon the retrieved data, and the new information that these IP addresses are associated with another IP address that is considered malicious or suspicious, the attack database 5 may be updated. Consider for example an IP address not previously classified as malicious or suspicious that is found at step 7 (or step 8) to be associated with the event IP address. This previously trusted or unknown IP address may now be re-classified as suspicious or malicious. The threat intelligence database is also updated at this time.

At step 10, the central server generates a topological map showing how any domains, subdomains or IP addresses link to the event IP address and to each other. The topological map is attached to the user interface alert from step 4. This map could for example be a geographical map of the world or a part of the world, tracing the attack back to a specific location.

By way of example, consider the case of an organization that subscribes to the threat protection service. A computer within the network initiates or establishes a connection to a server at a given IP address, and that IP address is determined to be malicious. The central server acts to update the attack database and threat intelligence database with details of domains and subdomains (IP addresses) that are linked to the given IP address.

It is then detected that further connections/connection attempts are made from computers within the network to other IP addresses linked to the given IP address. A determination is then made that the network is the subject of a coordinated attack. By analyzing the pattern of IP addresses and the associated domains and subdomains, a topological map is generated which identifies or points to the source of the attack.

An advantage of the approach described here is that the web crawler constructs a massive and extremely comprehensive database. When a coordinated attack is commenced against an organisation's computer network, the database can be easily accessed in order to identify patterns and hopefully identify the source of the attack.

It will be appreciated by the person skilled in the art that various modifications may be made to the above described embodiment without departing from the scope of the present invention.

The invention claimed is:

1. A method of detecting coordinated attacks on at least one of computers or computer networks via a world wide web, the method comprising:
   using a web crawler to crawl the world wide web to identify domains and subdomains and their associated internet protocol addresses, and to identify links between domains and subdomains, and storing the results in a database;
   detecting a connection or connection attempt to or from a computer or computer network;
   identifying a remote internet protocol address associated with the connection or connection attempt as being malicious or suspicious and using the internet protocol address as a lookup in the database to identify the associated domain and subdomain, and any linked domains and subdomains;
   identifying those linked domains and subdomains as malicious or suspicious;
   detecting further connections or connection attempts to or from the computer or computer network, determining that the associated remote internet protocol addresses are associated with the linked domains and subdomains; and
   as a result based on the detecting, generating a topological map identifying a coordinated attack on the at least one of computers or computer networks.

2. The method according to claim 1, wherein said identifying the remote internet protocol address as being malicious or suspicious comprises comparing the internet protocol address against internet protocol addresses stored in a database containing known internet protocol addresses and respective indications of trustworthiness.

3. The method according to claim 1 further comprising:
   continuously performing the using a web crawler to crawl the world wide web in order to construct a massive database of linked domains and subdomains and their internet protocol addresses.

4. The method according to claim 1, wherein if no linked domains or subdomains are identified, or the information is considered out of date, directing the web crawler to crawl a selected part of the world wide web in dependence upon the domain and subdomain associated with the internet protocol address.

5. The method according claim 1 further comprising:
   performing said detecting a connection or connection attempt to or from a computer or computer network at the computer or the computer network, sending an event notification including the remote internet protocol address, to a central server or server cloud, and performing said identifying at the central server.

6. A system for detecting coordinated attacks on at least one of computers or computer networks via a world wide web, the system performing operations comprising:

crawling the world wide web to identify domains and subdomains and their associated internet protocol addresses, to identify links between domains and subdomains, and to store the results in a database;

detecting or receiving a notification that a connection or connection attempt has been made to or from a remote computer or remote computer network, to identify a remote internet protocol address associated with the connection or connection attempt as being malicious or suspicious, to use the internet protocol address as a lookup in the database to identify the associated domain and subdomain, and any linked domains and subdomains, and to identify those linked domains and subdomains as malicious or suspicious;

detecting further connections or connection attempts to or from the computer or computer network, determining that the associated remote internet protocol addresses are associated with the linked domains and subdomains; and as a result based on the detecting, generating a topological map identifying a coordinated attack on the at least one of computers or computer networks.

7. A computer program product comprising a non-transitory computer storage medium having computer code stored thereon which, the computer code executed by at least one computer of a computer system, causes the computer system to:

use a web crawler to crawl the world wide web to identify domains and subdomains and their associated internet protocol addresses, and to identify links between domains and subdomains, and storing the results in a database;

detect a connection or connection attempt to or from a computer or computer network;

identify a remote internet protocol address associated with the connection or connection attempt as being malicious or suspicious and using the internet protocol address as a lookup in the database to identify the associated domain and subdomain, and any linked domains and subdomains;

identify those linked domains and subdomains as malicious or suspicious;

detect further connections or connection attempts to or from the computer or computer network, determine that the associated remote internet protocol addresses are associated with the linked domains and subdomains; and based on the detecting, generate a topological map identifying a coordinated attack on the computer system.

8. The computer program product according to claim 7, wherein said identifying the remote internet protocol address as being malicious or suspicious comprises comparing the internet protocol address against internet protocol addresses stored in a database containing known internet protocol addresses and respective indications of trustworthiness.

9. The computer program product according to claim 7 further comprising:

continuously performing using the web crawler to crawl the world wide web in order to construct a massive database of linked domains and subdomains and their internet protocol addresses.

10. The computer program product according to claim 7, wherein, if no linked domains or subdomains are identified, or the information is considered out of date, directing the web crawler to crawl a selected part of the world wide web in dependence upon the domain and subdomain associated with the internet protocol address.

11. The computer program product according to claim 7 further comprising:

performing said detecting a connection or connection attempt to or from a computer or computer network at the computer or the computer network, sending an event notification including the remote internet protocol address, to a central server or server cloud, and performing said identifying at the central server.

* * * * *